United States Patent
Umberger et al.

(10) Patent No.: US 12,546,765 B2
(45) Date of Patent: Feb. 10, 2026

(54) COMPOSITIONS AND METHODS FOR CALIBRATION AND QUALITY CONTROL

(71) Applicants: Roche Diagnostics Hematology, Inc., Indianapolis, IN (US); ROCHE DIAGNOSTICS OPERATIONS, INC., Indianapolis, IN (US)

(72) Inventors: Anne Umberger, Wellesley, MA (US); Kerri Elizabeth Horton, Arlington, MA (US); Daniel Lapen, Lancaster, MA (US); David J. Zahniser, Wellesley, MA (US); Mirko Klingauf, Rotkreuz (CH)

(73) Assignees: Roche Diagnostics Hematology, Inc., Indianapolis, IN (US); Roche Diagnostics Operations, Inc., Indianapolis, IN (US)

( * ) Notice: Subject to any disclaimer, the term of this patent is extended or adjusted under 35 U.S.C. 154(b) by 784 days.

(21) Appl. No.: 17/787,125

(22) PCT Filed: Dec. 18, 2020

(86) PCT No.: PCT/US2020/065997
§ 371 (c)(1),
(2) Date: Jun. 17, 2022

(87) PCT Pub. No.: WO2021/127424
PCT Pub. Date: Jun. 24, 2021

(65) Prior Publication Data
US 2023/0047416 A1 Feb. 16, 2023

Related U.S. Application Data

(60) Provisional application No. 62/950,796, filed on Dec. 19, 2019.

(51) Int. Cl.
*G01N 33/50* (2006.01)
*G01N 33/52* (2006.01)
*G01N 33/96* (2006.01)
*G01N 15/10* (2006.01)

(52) U.S. Cl.
CPC ......... *G01N 33/5094* (2013.01); *G01N 33/52* (2013.01); *G01N 33/96* (2013.01); *G01N 15/1012* (2013.01); *G01N 2496/00* (2013.01)

(58) Field of Classification Search
CPC .... G01N 33/5094; G01N 33/52; G01N 33/96; G01N 15/1433; G01N 15/01; G01N 15/1012; G01N 2015/012; G01N 2015/016; G01N 2015/1006; G01N 2015/1014; G01N 2015/1486; G01N 2015/1497; G01N 2015/018; G01N 2015/1493; G01N 1/312; G01N 21/4785; G01N 21/278; G01N 2035/00138; G01N 35/00029; G01N 35/00693; G01N 35/1002; G01N 2496/00

USPC ............. 436/8, 10, 16, 43, 46, 164; 422/73, 422/82.05
See application file for complete search history.

(56) References Cited

U.S. PATENT DOCUMENTS

| | | | |
|---|---|---|---|
| 4,689,307 A | 8/1987 | Schwartz | |
| 4,714,682 A | 12/1987 | Schwartz | |
| 4,774,189 A | 9/1988 | Schwartz | |
| 5,728,582 A | 3/1998 | Taki et al. | |
| 6,074,879 A | 6/2000 | Zelmanovic | |
| 6,521,729 B1 | 2/2003 | Zelmanovic | |
| 6,905,881 B2 | 6/2005 | Sammak et al. | |
| 7,176,031 B2 | 2/2007 | Li et al. | |
| 7,482,167 B2 | 1/2009 | Sammak | |
| 7,670,798 B2 * | 3/2010 | Ornstein | G01N 15/1459 435/243 |
| 8,187,885 B2 | 5/2012 | Purvis | |
| 8,465,775 B2 | 6/2013 | DeSimone et al. | |
| 8,835,122 B2 | 9/2014 | Roggenbuck | |
| 8,994,940 B2 | 3/2015 | Dowaki et al. | |
| 10,764,538 B2 | 9/2020 | Winkelman et al. | |
| 11,047,845 B1 * | 6/2021 | Barry, Jr. | G01N 15/14 |
| 2003/0129754 A1 * | 7/2003 | Samsoondar | G01N 33/72 436/171 |

(Continued)

FOREIGN PATENT DOCUMENTS

| | | |
|---|---|---|
| CN | 103267838 A | 8/2013 |
| EP | 0887637 | 12/1998 |

(Continued)

OTHER PUBLICATIONS

CN Office Action in Chinese Appln. No. 202080088225.0, mailed on Oct. 30, 2024, 13 pages (with English translation).

(Continued)

*Primary Examiner* — Maureen Wallenhorst
(74) *Attorney, Agent, or Firm* — Fish & Richardson P.C.

(57) ABSTRACT

The disclosure features calibration fluids that include a plurality of beads, such as cellulose, silica, poly(methylmethacrylate) (PMMA), melamine, cross-linked agarose, polyvinylacetate (PVA), and/or polystyrene beads, where the beads are sized and colored to represent at least one type of blood cell; and a carrier fluid, that can include a polymer or polymerizing matrix, e.g., a water-soluble resin, e.g., an acrylic or polyurethane water-soluble resin or a starch or a cellulose, serum, and/or one or more or sugars. The disclosure also features methods of using the calibration fluids to calibrate automated sample preparation systems, such as automated hematology analyzer systems, e.g., image-based hematology analyzer systems.

17 Claims, 9 Drawing Sheets

(56) References Cited

U.S. PATENT DOCUMENTS

| | | | |
|---|---|---|---|
| 2003/0142289 A1 | | 7/2003 | Ortyn et al. |
| 2004/0175832 A1 | | 9/2004 | Hui et al. |
| 2005/0255447 A1 | * | 11/2005 | Ortiz .................... G01N 33/96 |
| | | | 435/13 |
| 2006/0045814 A1 | | 3/2006 | Zhang |
| 2009/0269799 A1 | | 10/2009 | Winkelman et al. |
| 2013/0115169 A1 | | 5/2013 | Lahann et al. |
| 2016/0216283 A1 | | 7/2016 | Hughes et al. |

FOREIGN PATENT DOCUMENTS

| | | |
|---|---|---|
| JP | H03180742 A | 8/1991 |
| JP | H08005543 A | 1/1996 |
| JP | H09196916 A | 7/1997 |
| JP | H1183724 A | 3/1999 |
| JP | 2007178315 A | 7/2007 |
| JP | 2007518063 A | 7/2007 |
| JP | 2014-517324 A | 7/2014 |
| JP | 2015526713 A | 9/2015 |
| KR | 20110018798 A | 2/2011 |
| WO | 97/35201 * | 9/1997 |
| WO | WO 1997/035201 | 9/1997 |
| WO | WO 2014/127372 | 8/2014 |

OTHER PUBLICATIONS koboproductsinc.com, "Microspheres," dated Feb. 26, 2016, retrieved Dec. 23, 2022 from URL <http://web.archive.org/web/20160617023852/https://www.koboproductsinc.com/downloads/kobo-microspheres.pdf>, 2 pages.

PCT International Preliminary Report on Patentability in International Appln. No. PCT/US2020/065997, dated May 17, 2022, 6 pages.

PCT International Search Report and Written Opinion in International Appln. No. PCT/US2020/065997, dated Mar. 8, 2021, 8 pages.

JP Office Action in Japanese Appln. No. 2022-538441, mailed on Aug. 1, 2023, 15 pages (with English translation).

EP Extended European Search Report in European Appln. No. 20903073.3, mailed on Jan. 2, 2024, 11 pages.

CN Office Action in Chinese Appln. No. 202080088225.0, mailed on Jun. 21, 2024, 28 pages (with English translation).

* cited by examiner

COMPOSITIONS AND METHODS FOR CALIBRATION AND QUALITY CONTROL

CROSS-REFERENCE TO RELATED APPLICATIONS

This application is a national stage application of International Application No. PCT/US2020/065997 (published as WO 2021/127424), filed on Dec. 18, 2020, which claims the benefit of U.S. Provisional Application No. 62/950,796, filed on Dec. 19, 2019, the entire contents of which are hereby incorporated by reference.

TECHNICAL FIELD

The present disclosure relates to the calibration of sample processing systems for use with various fluid samples such as blood and other biological fluids, and with tissue samples, as well as materials for quality control and for monitoring performance of sample processing systems.

BACKGROUND

Laboratory technicians have for many years examined a variety of biological samples, such as, i.e., blood, by first applying a sample to a substrate such as a microscope slide, and then viewing the prepared substrate, e.g., under a microscope. Manual application procedures are subject to variations in quality that are due to differences in skill and experience among individual technicians, as well as day-to-day variations in the application steps. Further, the manual preparation of biological samples on substrates is comparatively slow as it typically involves multiple labor-intensive steps.

There are numerous automated cell sample analysis systems, such as flow cytometers and impedance-based cell counting systems, which can be quite effective in analyzing large numbers of biological samples, such as blood samples. In addition, automated image-based cell counters for biological samples are available, such as the cobas® m 511 integrated hematology analyzer (Roche Diagnostics), for example, as disclosed in, e.g., U.S. Pat. Nos. 9,217,695; 10,094,764; and 10,764,538. Such image-based counters are used to analyze blood samples, as well as for counting various cell types to determine cell concentration and viability, and/or to count certain subtypes of cells. Such systems can image cells as they pass a detector while flowing in a liquid suspension. Other systems place cells onto a substrate before imaging. In both cases, the cells may be stained with absorbing dyes or other stains, e.g., fluorescent reagents, to allow visualization of the cellular components. However, all of these automated systems require calibration upon initial set-up, for linearity testing, and on a routine basis using controls or standards to ensure accurate results of cell analysis.

Current calibration and quality control fluids for hematologic analysis such as the Complete Blood Count (CBC) are produced using biologic material from a number of unverified blood bearing species, and have a high degree of lot-to-lot variability. For example, variability has been seen in white blood cell (WBC) counting and differentiation, and in platelet (PLT) size parameters, and the need exists for more stable and reliable calibration and quality control fluids.

SUMMARY

It is against the above background that the embodiments of the present disclosure provide certain unobvious advantages and advancements over the prior art. In particular, the inventors have recognized a need for improvements in compositions and methods for calibration and quality control.

The present disclosure is based, at least in part, on the discovery that calibration fluids including certain sizes of beads, e.g., cellulose, silica, and/or polystyrene and other types of beads, optionally including purified and stabilized blood cells, e.g., red blood cells (RBCs), can be used to calibrate automated, image-based hematology analyzer systems that use glass or plastic substrates, e.g., slides, for biological sample analysis, because the beads in these fluids can be attached or adhered to the glass or plastic substrates and in some embodiments can be stained, and in all embodiments can be imaged, by the hematology analyzer systems, all in the same manner as biological samples that include one or more biological cells. The counting, sizing, and stain uptake abilities of the beads allow for an assessment of the printing process, the fixation process (e.g., with methanol), the staining process, and the imaging process of such hematology analyzer systems.

In a first aspect, the disclosure provides calibration fluids that include a plurality of beads, where the beads are sized and colored to represent at least one type of blood cell; and a carrier fluid. In these calibration fluids, the plurality of beads can include a first set of beads sized and colored to represent white blood cells (WBCs). For example, the plurality of beads representing WBCs can include a plurality of orange silica beads to represent neutrophils; a plurality of blue polystyrene beads to represent lymphocytes; a plurality of green polystyrene beads to represent monocytes; a plurality of red polystyrene beads to represent eosinophils; and a plurality of black polystyrene beads to represent basophils.

In some embodiments, the calibration fluids further include stabilized red blood cells (RBCs) or stabilized platelets (PLTs), or both stabilized RBCs and PLTs.

In other embodiments, the plurality of beads in the calibration fluids further include a second set of beads, different from the first set of beads, that is sized and colored to represent red blood cells (RBCs). In still other embodiments, the calibration fluids can further include a third set of beads, different from the first set and second set of beads, that is sized and colored to represent platelets (PLTs).

In various embodiments, the carrier fluids can be or include a water-soluble polymerizing matrix, such as an acrylic or polyurethane resin.

In different embodiments, the beads in the calibration fluids can be or include one or more of cellulose beads, silica (silicon dioxide) beads, poly(methyl-methacrylate) (PMMA)/hydrogel coated beads, melamine (melamine formaldehyde resin) beads, Sepharose™ (cross-linked agarose) beads, polyvinylacetate (PVA) beads, and polystyrene beads.

In some embodiments, the beads are functionalized. For example, the beads are functionalized with one or more of the following groups: mercapto groups, hydroxyl groups, carboxyl groups, disulfide groups, polyvinylalcohol groups, amine groups (primary and secondary ammonium), maleimido groups, tertiary ammonium groups, quaternary ammonium groups, epoxy groups, carboxylsulfonate groups, and octadecyl (C18) groups.

In embodiments, the beads have a diameter of about 1 to about 10 microns, and a density of about 1.0 to about 3.0 grams/cm$^3$.

If various embodiments, the carrier fluid includes a water-soluble polymer or polymerizing matrix, e.g., an acrylic or polyurethane resin. In other embodiments, the water-soluble polymer includes a starch, e.g., hydroxyethyl starch or a cellulose, e.g., methylcellulose. In yet other embodiments, the carrier fluid can include, or also include serum and/or cerebrospinal fluid.

In some embodiments, the carrier fluid includes one or more or sugars, such as glucose, fructose, mannose, maltose, galactose, lactose, ribose, and/or rhamnose, as single molecules or dimers, in any combination.

In another aspect, the disclosure provides methods of calibrating automated sample preparation systems, such as automated hematology analyzers, e.g., image-based hematology analyzers. These methods include a calibration fluid as described herein; adding a volume of the calibration fluid onto a substrate to create a calibration sample; staining the calibration sample with a first stain; rinsing the first stain from the calibration sample; imaging of the calibration sample; determining from the images of the calibration sample a calibration status of the automated sample preparation system; and adjusting at least one aspect of the automated sample preparation system as required based on the calibration status.

In these methods, determining a calibration status of the automated sample preparation system can include calculating, from one or more images of the calibration sample, a value of at least one calibration parameter; and comparing, by a processor, the value of the at least one calibration parameter with a known reference range of the at least one calibration parameter.

In some embodiments, the methods further include determining that the value of the at least one calibration parameter is outside the known reference range; and notifying a user to adjust at least one aspect of the automated sample preparation system that relates to the at least one calibration parameter. In some embodiments, the methods further include determining that a user has adjusted at least one aspect of the automated sample preparation system; determining that the value of the at least one calibration parameter is now within the known reference range; and notifying the user that the automated sample preparation system is correctly calibrated.

In some embodiments, the methods further include, after dispensing the volume of calibration fluid onto the substrate, transporting the substrate with a substrate mover to a staining station. In the same or other embodiments, the methods can further include staining the calibration sample with a second stain, wherein the beads are configured to absorb the second stain. Stains can be selected, for example, from the group consisting of Eosin Y, Azure B, and methylene blue.

In some embodiments, a first set of beads of the plurality of beads is sized and colored to represent white blood cells (WBCs), and/or the methods can further include using a second set of beads of the plurality of beads, different from the first set of beads, that is sized and colored to represent red blood cells (RBCs).

In certain embodiments, the methods as described herein can further include one or more of: (a) detecting if one side of a printed sample containing the beads is thicker than the other, and based on a reference thickness of the printed sample, determining whether a printing needle of the system is out of tolerance; (b) calculating a size of the beads, and based on a known size of the beads in the sample, determining whether measurements of the beads taken from the image are within tolerance of a reference size range; and (c) determining a perceived color of stained beads by applying a particular wavelength of light at the imaging station, and based on a reference color of the beads in the sample, determining whether the light source for the particular wavelength at the imaging station is within tolerance.

In some of the embodiments, the calibration fluid includes one or more blood components, e.g., serum or cerebrospinal fluid.

The new calibration fluids, e.g., including beads, e.g., cellulose, silica, PMMA/hydrogel coated beads, melamine beads, Sepharose™ (cross-linked agarose) beads, PVA beads, or polystyrene beads, and optionally purified and stabilized blood cells, and methods described herein provide numerous advantages and benefits. For example, beads in the calibration compositions are highly stable and can be printed, fixed, stained, and imaged all in the same manner as biological cells in a blood or tissue sample. In addition, the beads are generally flexible, which allows them to move through the printing needle of an automated hematology analyzer system in a manner similar to biological cells. The beads are combined with a specific carrier liquid, e.g., an acrylic and/or polyurethane water-soluble polymerizing matrix, e.g., resin, or other polymers such as starches, e.g., hydroxyethyl starch, or cellulose, e.g., methylcellulose, and/or sugars (e.g., glucose, fructose, mannose, maltose, galactose, lactose, ribose, and/or rhamnose, as single molecules or dimers, in any combination) or serum, in the calibration fluids to provide advantageous adhesion properties to allow the beads to stick to a glass slide (or other substrate) when printed.

Furthermore, the beads in the calibration fluids can, in certain embodiments, absorb one or more different stains during a staining process in an automated hematology analyzer system. This is different from standard plastic beads, which are generally pre-stained, and thus would not allow for analysis of the functionality of the staining assembly of the automated hematology analyzer system. However, certain pre-stained beads can also be used advantageously in the new calibration fluids. The new beads and methods also permit quality control on a per sample basis and are relatively low cost compared to other quality control methods and systems.

The calibration fluids also can be introduced into biological samples and the beads in the fluids can be differentiated from cells or other biologic material in the biological samples during imaging in an automated hematology analyzer system because of their consistency of size and shape and color. Because the beads can be easily identified, the automated hematology analyzer systems can measure the beads based on images of the beads and use the measurements to calibrate aspects of the analyzer system. The beads can also be incorporated into quality control materials, which can be processed by the automated hematology analyzer system for monitoring performance of such systems. Additionally, the images of the beads can be used to inform a user of deficiencies in the system (e.g., a stain not being applied, a light source, e.g., an LED, being out or outside its acceptable wavelength range, or a sample applicator needle being clogged) that may need to be addressed before the automated hematology analyzer system can process samples.

Additionally, the calibration fluids can be used to efficiently and easily calibrate the automated hematology analyzer system and other cell analysis systems, because the calibration fluids can be run through the system in the same manner as any other biological or other sample. The calibration fluids are designed to have a long shelf life and the beads in these fluids are consistently sized and shaped and can have unique color and staining characteristics. The beads can be run through the systems in relevant concentrations to test the systems' functionality in analyzing samples containing a number of particles in the range of concentrations for which the automated hematology analyzer systems are approved to detect. The calibration fluid can be run through the automated hematology analyzer system just as any other biological sample.

Further, the beads in fluids can be introduced into biological samples with low concentrations of cells (e.g., samples with low numbers of cells, such as cerebrospinal fluid) to aid in focusing the imaging assembly on the sample where focusing would otherwise be difficult. The beads in the fluids do not interfere with imaging the cells in a biological sample and do not break down during the printing, fixing, staining, and imaging processes of the automated hematology analyzer system.

Terms such as "preferably," "commonly," and "typically" are not utilized herein to limit the scope of the claimed subject matter or to imply that certain features are critical, essential, or even important to the structure or function of the embodiments disclosed herein. Rather, these terms are merely intended to highlight alternative or additional features that may or may not be utilized in a particular embodiment of the present disclosure.

The terms "substantially" and "about" may be utilized herein to represent the inherent degree of uncertainly that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise defined, all technical and scientific terms used herein have the same meaning as commonly understood by one of ordinary skill in the art to which this disclosure belongs. Although methods and materials similar or equivalent to those described herein can be used in the practice or testing of embodiments of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

These and other features and advantages of the embodiments of the present disclosure will be apparent from the following detailed description, and from the claims. It is noted that the scope of the claims is defined by the recitations therein and not by the specific discussion of features and advantages set forth in the present description.

DESCRIPTION OF DRAWINGS

The following detailed description of the embodiments of the present disclosure can be best understood when read in conjunction with the following drawings, where like structure is indicated with like reference numerals and in which.

Figure 1:
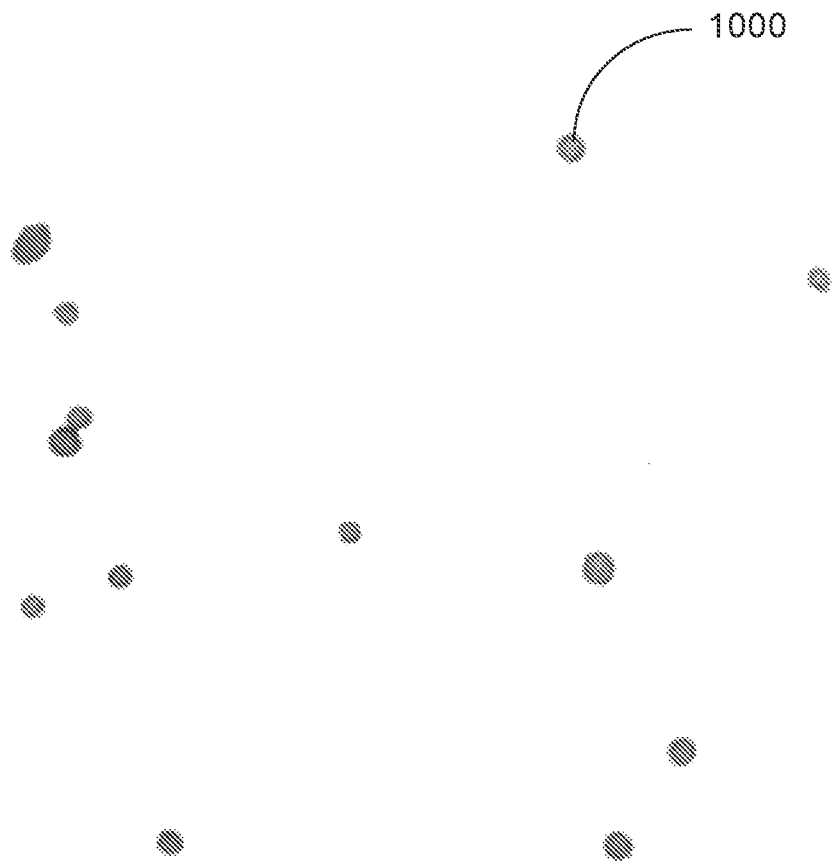
FIG. 1 is an image of printed and stained cellulose beads taken on an automated hematology analyzer system in accordance with one embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

Disclosed herein are methods and systems for calibrating and assessing functionality of an automated biological sample processing system (e.g., an automated hematology analyzer system) using calibration fluids. The automated sample processing methods and systems provide advantages over manual and other automated processing methods, including enhanced processing speed while using minimal reagent volumes and concurrently producing a uniform sample preparation that significantly reduces the variability associated with the application of stains, fixatives, and other reagents as compared to samples processed by hand or by other systems. Automated biological sample processing systems must be calibrated to produce uniform and repeatable results. As disclosed herein, calibration fluids or quality control fluids that include beads, e.g., cellulose, silica, PMMA/hydrogel coated beads, melamine beads, Sepharose™ (cross-linked agarose) beads, PVA beads, and/or polystyrene beads, and optionally preserved blood cells, can be run through the automated sample processing systems in the same manner, or essentially the same manner, as normal biological samples. The beads can be printed, fixed, stained, imaged, and measured by the automated sample processing systems, and the results can be used to calibrate and/or monitor the performance of one or more portions/components of the automated sample processing system.

General Methodology

Calibration and Quality Control Fluids Made with Different Sample Fluids

Calibration fluids are used to adjust the operation of specific components of image-based analyzer systems (e.g., printing, staining, or imaging) to align the systems to produce precisely known values of system measurements predetermined at the time of the calibration fluid manufacture. A calibration may be performed at the time of installation of new systems and periodically (e.g., every 6 months) during the use of the system or when major system components are changed. Quality control fluids are typically used on a daily basis to monitor the performance of the system during routine use. Such quality control fluids often cover a spectrum of cellular counts to be sure the system is performing over its dynamic range in the routine.

Beads such as cellulose, silica, PMMA/hydrogel coated beads, melamine beads, Sepharose™ (cross-linked agarose) beads, PVA beads, and/or polystyrene beads can be added to any number of biological fluids, including blood, cerebrospinal fluid, synovial fluid, and serum to create a calibration or quality control fluid for monitoring the performance of an automated hematology analyzer system. Beads can also be incorporated into non-biological fluids including buffers to create calibration fluids and quality control fluids. The beads can be included in varying concentrations depending on the fluid or purpose of the calibration. For example, a lower concentration of cellulose and/or other beads can be incorporated into a sample mimicking a cerebrospinal fluid where smaller RBCs and larger WBCs are counted, as there are generally low concentrations of cells in cerebrospinal fluid (e.g., five to 1000 RBCs and/or WBCs).

Biological samples that can include cellulose and/or other beads to create calibration or quality control fluids include, for example, a blood sample containing red blood cells, white blood cells, and platelets. In addition, other biological samples that include red blood cells and/or white blood cells and/or platelets, such as bone marrow suspensions, urine, vaginal/cervical cell suspensions, epithelial tissue suspensions, tumor suspensions, semen, sputum, and saliva, can also be applied to substrates. Other fluids that can be applied to substrates and that can contain cells of interest include, but are not limited to, cerebrospinal fluid (CSF), serous fluids including pleural fluid, peritoneal fluid (e.g., due to conditions such as ascites), pericardial fluid, synovial fluid, and continuous ambulatory peritoneal dialysis (CAPD) fluid. Fluids that do not contain cells, but that can also be applied to substrates include, but are not limited to, blood plasma (e.g., plasma, e.g., at 40%, and a sugar such as glucose, e.g., at 20%), hydroxyethyl starch 6% (Voluven™), methylcellulose, and serum. Other sugars that can be used include fructose, mannose, maltose, galactose, lactose, ribose, and/or rhamnose, as single molecules or dimers, in any combination.

The calibration fluids or control fluids can also include water-soluble suspension fluids such as acrylic and/or polyurethane polymerizing resins, or other polymers, proteins, and/or sugars to ensure that the beads will stick to the slide or substrate during processing by the automated sample processing systems, e.g., image-based hematology analyzer systems. When a resin is used, the concentration of the resin in the final calibration fluid should be sufficient to cure between the time of application to the substrate and before the staining step in the process. This provides robust adhesion of the beads in the calibration fluid to the substrate during all steps of the automated process. Typical concentrations of the acrylic or polyurethane polymerizing matrix, e.g., resin, in a water base range from about 0.2 to about 5% by weight.

The retention of the beads to the slides can be further increased by addition of polymers such as starches, e.g., hydroxyethyl starch and cellulose starches, such as methylcellulose starch, as well as certain bioinks, which can be any natural or synthetic polymer selected for its biocompatible components and favorable rheological properties. These characteristics temporarily or permanently support living cells to facilitate their adhesion, proliferation, and differentiation during maturation. In other embodiments, the polymers can include polyvinyl alcohol (PVA), polyvinyl pyrrolidone (PVP), glycogen, amylopectin, gelatin, gelatin succinate, agarose, alginate, collagen, and chitosan. In addition, hydroxyethyl starch is the main ingredient of Venofundin™—a colloidal plasma volume expander used in emergency medicine, which can also be used in the present calibration and control fluids.

In other embodiments, the slides can be pretreated, e.g., pre-coated, with poly-L-lysine or be plasma treated to increase bead attachment to the slides. The slides can also be coated during the printing process.

The water-soluble polymerizing resins used were water-soluble acrylic-based or polyurethane-based solutions. One main feature is that the polymerizing resins (being water-soluble) can be cleaned by water-based cleaning agents on the instruments being calibrated, and that the water-soluble polymerizing resins do not adversely affect any cellular components added to the mixture. Another feature of the water-soluble polymerizing resins is that they cure rapidly in air, thus affixing the cells and beads to the slide or substrate, which inhibits bead removal by subsequent staining operations.

Diluents and other constituents can also be added to the calibration fluids as needed to achieve desired consistency and concentration, which may be necessary for effective sample preparation, staining, imaging, and analysis. For example, a sugar such as glucose can be added (e.g., in the range of 2-5% or more, up to 10, 15, or 20%, glucose) to aid in print uniformity and stability, and to further enhance adhesion to the substrate. Other sugars that can be used include fructose, mannose, maltose, galactose, lactose, ribose, and/or rhamnose, as single molecules or dimers, in any combination.

In general, the beads should have the following properties. In terms of size, beads can be the size of different cells in a blood sample, for example, 1 to 10 microns, e.g., 3 to 10 microns, e.g., 4 to 6 microns or 3 to 8 microns, e.g., to mimic the size of blood cells, e.g., red blood cells. This size provides a good stain score with a typical objective, e.g., 20 × objective, and in some instances, larger particles may wash off during staining, in particular particles large than 10 microns. The beads can have a slight porosity (e.g., pores of 15 nm or larger) or surface roughness to support better stain uptake and to reduce the number of beads that wash off during staining and washing steps. The density of the beads should be about 1 gram/cm$^3$, which is the density or water. Increased density (above 1.5 grams/cm$^3$) creates a localized higher wall shear stress, which can rip the particle from the surface, increasing wash-off during staining and washing. Beads with a density below 0.9 gram/cm$^3$ will not form a suspension, but rather will float on top of the aqueous solution used as storage matrix. In addition, monodisperse beads are easier to use and are easier to quantify for stain score evaluation by automated systems.

Bead Functionalization

Various types of beads can be derivatized or functionalized, e.g., coated, in numerous ways to enhance the beads' abilities and functions, e.g., to better bind to certain stains and dyes, to alter the positive or negative charge of the beads, to change the acid or base strength, and/or to alter their porosity. The nature of a functionalization can affect the color uptake kinetics, color release kinetics, and/or the color intensity. For example, different positive or negatively charged surface modifications allow for a color differential as certain dyes and stains, such as eosin and methylene blue, have different charges and different stain strength. In addition, when mixing differently functionalized beads—all types of beads should retain an equal zeta potential in solution at a defined stable pH to help avoid aggregation and clumping.

Different functional groups include, for example, mercapto, hydroxyl, carboxyl, disulfide, polyvinylalcohol, amines (primary and secondary ammonium), maleimido, tertiary ammonium, quaternary ammonium, epoxy, carboxylsulfonate, and octadecyl (C18) groups. However, available functionalization depends on the bead material. Bead/functional group combinations can include, for example, PMMA, polystyrene, melamine, or silica beads with carboxyl groups, PMMA, silica, or melamine with amine groups, polystyrene beads with carboxylsulfonate groups. In other examples, PMMA beads can be derivatized or functionalized with mercapto, hydroxyl, carboxyl, disulfide, polyvinylalcohol, amines (primary and secondary ammonium), maleimido, and/or carboxylsulfonate groups. In some other examples, polystyrene beads can be functionalized with carboxyl or carboxylsulfonate groups, and silica beads can be functionalized with carboxyl or amine groups. Melamine beads can be functionalized with, e.g., carboxyl or carboxylsulfonate and primary, secondary, tertiary, or quaternary ammonium groups. Sepharose beads can be functionalized, for example, with tertiary or quaternary ammonium groups.

Cellulose Bead Properties

Cellulose beads can be obtained in varying sizes, e.g., 1 to 50 microns in diameter, and densities, e.g., within a range of about 0.1 to 20 g/cm$^3$, e.g., about 1.0 to 10 g/cm$^3$, or 2.5 to 5 g/cm$^3$, e.g., 1.0, 1.02, 1.05, 1.1, 1.13, 1.15, 1.17, or 1.2 g/cm$^3$. An image of an example of a sample of cellulose beads under magnification is shown in FIG. 1. For example, cellulose beads for inclusion in a calibration fluid can have a diameter of approximately 1, 2, 3, 4, 5, 6, 7, 8, 9, 10, 11, 12, 13, 14, 15, 20, 25, 20, 25, 40, 45, or 50 microns. However, cellulose beads of a smaller size, e.g., less than 8 microns may be somewhat more difficult to handle. The cellulose beads can be selected to mirror a size of a particular cell type of interest, for example, red blood cells (RBC) (3-8 microns), white blood cells (WBC) (6-15 microns), circulating tumor cells (CTC) (8-15 microns), or platelets (approximately 2 microns). A zeta potential for cellulose beads can be about –30 mV at pH 7.4 (IEP pH 2.8).

The type of cell of interest may vary depending on the type of sample being investigated. For example, if the sample is a cerebrospinal fluid sample and the imaging is being performed to investigate the presence or absence of blood cells in the cerebrospinal fluid, the beads sizes may be chosen to parallel the sizes of red and/or white blood cells. The size of the cellulose beads may be limited by the diameter of the printing needle of the automated hematology analyzer system, as the beads are printed through the needle during sample preparation.

Cellulose beads typically are purchased as a dry powder (e.g., manufactured by Kobo Products, Inc., South Plainfield, N.J., USA), which generally has a long shelf life. The beads are generally uniformly shaped, which allows the beads to be differentiated from cellular content in imaging during calibration and quality control protocols. Cellulose beads are hydrophilic and their advantageous properties for inclusion in a calibration or quality control liquids for an automated hematology analyzer system appear when they are moistened.

Cellulose beads, and any of the beads described herein, can be mixed with a variety of fluids, including blood, plasma (e.g., plasma 40% and glucose 20%), serum, cerebrospinal fluid, PLASMALYTE®, PLASMANATE®, hydroxyethyl starch 6% (Voluven™), methylcellulose, polymerizing matrices, e.g., resins, and distilled water, to form calibration fluids and quality control fluids for processing.

The cellulose beads' hydrophilic properties allow the beads to absorb stain from a staining step performed during automated hematology analysis. The stains used in the staining step may include, for example, Eosin Y, Azure B, methylene blue, hematoxylin, papanicolaou (PAP), fluorescent stains, or supravital stains, and different combinations thereof. During imaging of the sample including the cellulose beads, the coloring and coverage of the stains may be assessed. In some instances, a substrate with a size grid may be used to provide a guide for determining cell and/or bead coverage on the substrate. During imaging, focusing parameters of the automated hematology analyzer system can be checked as well.

For example, FIG. 1 is an image of printed and stained cellulose beads 100 taken on an automated hematology analyzer system. The hydrophilic nature of the beads allows a stain to be absorbed and later imaged. For the Romanovsky stain used in hematology, the fixative, red and blue dyes, and a rinse can be applied sequentially. Standard stain times of about 10 seconds of only the blue dye were used to produce the sample shown in FIG. 1. Similar staining intensity could be found with the red dye, and with combinations of the fixative with the red or the blue dyes. However, the water-based rinse would typically reduce the staining intensity.

Silica Bead Properties

Silica beads are readily available, are stainable by automated biological sample processing systems, are available in the 1 to 15 micron size range, and are also available in a wide variety of chemical coatings. These coating will modify the staining of the beads by the different systems. Silica bead density can be about 1 to 5 g/cm$^3$, e.g., 2 to 3 g/cm$^3$, e.g., 2.0, 2.1, 2.2, 2.3, 2.4, 2.5, 2.55, 2.6, 2.65, 2.7, 2.75, 2.8, 2.9, or 3.0 g/cm$^3$.

Silica beads that are uncoated, or in a natural state, can be stained light blue by a Romanowsky stain. This is due to the charges on the dyes in the Romanowsky stain. Silica beads that are coated (derivatized) to create an —NH$_3$ surface, produce a high positive charge on the beads, which attracts the negative charged dye (Eosin Y) in the Romanowsky stain which causes the —NH$_3$ coated beads to stain red.

Silica beads that are coated with —COOH produce a negative charge on the beads, which attracts the positive dyes (Azure B, Methylene Blue) in the Romanowsky stain, causing the beads to stain a dark blue.

The charge modification and chemical modification of silica beads allows staining by other stains, e.g., hematoxylin, papanicolaou (PAP) stains, fluorescent stains, or supravital stains, and different combinations thereof.

Silica beads and derivatized silica beads have been used in a number of industries for decades and are thus readily available. Most notably, they are available from companies that supply beads in various sizes and coating for use in High Performance Liquid Chromatography (HPLC).

Polystyrene Bead Properties

Polystyrene beads are not typically stained by the automated biological sample processing systems, but they are available in highly defined size ranges, and are available in a variety of pre-stained colors. Polystyrene beads can be obtained in varying sizes, e.g., 1 to 50 microns in diameter, and densities, e.g., within a range of about 0.1 to 1.05 g/cm$^3$, e.g., about 0.9 to 1.0 g/cm$^3$, e.g., 0.95, 1.0, 1.01, 1.02, 1.05 g/m³. The zeta potential of polystyrene beads can be, for example, 5 to 30 mV when $NH_2$ functionalized or about −30 mV when SO3 functionalized.

The pre-stained colors can be used to verify spectral wavelengths and other measurement features used in optical imaging systems and/or for calibration, for example, to calibrate a printing process (e.g., without washing or other steps). Such pre-stained polystyrene beads are available from various manufacturers for verification of measurement properties of flow-based systems.

PMMA/Hydrogel Coated Bead Properties

PMMA beads can be obtained in varying sizes, e.g., 1 to 50 microns in diameter, and densities, e.g., within a range of about 0.1 to 1.18 g/cm³, e.g., about 0.5 to 1.18 g/cm³, or 1 to 2 g/cm³, e.g., 1.0, 1.02, 1.05, 1.1, 1.15, 1.18, or 1.2 g/m³. For example, PMMA beads for inclusion in a calibration fluid can have a diameter of approximately 1, 2, 3, 4, 5, 6, 7, 8, 9, 10, 11, 12, 13, 14, 15, 20, 25, 20, 25, 40, 45, or 50 microns. The PMMA beads can be selected to mirror a size of a particular cell type of interest, for example, red blood cells (RBC) (3-8 microns), white blood cells (WBC) (6-15 microns), circulating tumor cells (CTC) (8-15 microns), or platelets (approximately 2 microns). The zeta potential of PMMA beads can be, for example, −10 mV at pH 7.4 (IEP pH 6.67) when NH2 functionalized.

The type of cell of interest may vary depending on the type of sample being investigated. For example, if the sample is a cerebrospinal fluid sample and the imaging is being performed to investigate the presence or absence of blood cells in the cerebrospinal fluid, the beads sizes may be chosen to parallel the sizes of red and/or white blood cells. The size of the PMMA beads may be limited by the diameter of the printing needle of the automated hematology analyzer system, as the beads are printed through the needle during sample preparation.

PMMA beads can be produced to varying specifications, e.g., monodisperse in 10% solution w/v in water. PMMA beads should be hydrogel coated to achieve surface functionalization, if desired.

Melamine Bead Properties

Melamine beads can be obtained in varying sizes, e.g., 1 to 50 microns in diameter, and densities, e.g., within a range of about 0.1 to 1.57 g/cm³, e.g., about 0.9 to 1.57 g/cm³, or 1.0 to 1.5 g/cm³, e.g., 1.0, 1.02, 1.05, 1.1, 1.15, 1.2, 1.3, 1.4, 1.5, or 1.57 g/m³. For example, melamine beads for inclusion in a calibration fluid can have a diameter of approximately 1, 2, 3, 4, 5, 6, 7, 8, 9, 10, 11, 12, 13, 14, 15, 20, 25, 20, 25, 40, 45, or 50 microns. The melamine beads can be selected to mirror a size of a particular cell type of interest, for example, red blood cells (RBC) (3-8 microns), white blood cells (WBC) (6-15 microns), circulating tumor cells (CTC) (8-15 microns), or platelets (approximately 2 microns).

The type of cell of interest may vary depending on the type of sample being investigated. For example, if the sample is a cerebrospinal fluid sample and the imaging is being performed to investigate the presence or absence of blood cells in the cerebrospinal fluid, the beads sizes may be chosen to parallel the sizes of red and/or white blood cells. The size of the melamine beads may be limited by the diameter of the printing needle of the automated hematology analyzer system, as the beads are printed through the needle during sample preparation.

Melamine beads can be produced to varying specifications, e.g., monodisperse in 10% solution w/v in water.

Sepharose™ (cross-linked agarose) Beads Properties

Sepharose beads can be obtained in varying sizes, but are generally non-uniform, and can be produced with a mean diameter of 8.5 microns or larger, and can have a wide range of densities. For example, Sepharose beads for inclusion in a calibration fluid can have a diameter of approximately 8.5, 24, 25, 30, 35, 40, 45, or 50 microns. The Sepharose beads can be selected to mirror a size of a particular cell type of interest. Sepharose beads also have pores of about 70 nm in diameter.

The size of the Sepharose beads may be limited by the diameter of the printing needle of the automated hematology analyzer system, as the beads are printed through the needle during sample preparation.

Sepharose beads can be produced to varying specifications, e.g., dispersed in a suspension in ethanol to avoid clumping.

Polyvinylacetate (PVA) Bead Properties

PVA beads can be obtained in varying sizes, e.g., 1 to 50 microns in diameter, and densities, e.g., within a range of about 0.1 to 1.19 g/cm³, e.g., about 0.9 to 1.19 g/cm³, e.g., 0.95, 0.98, 0.99, 1.0, or 1.1 g/cm³. For example, PVA beads for inclusion in a calibration fluid can have a diameter of approximately 1, 2, 3, 4, 5, 6, 7, 8, 9, 10, 11, 12, 13, 14, 15, 20, 25, 20, 25, 40, 45, or 50 microns. The PVA beads can be selected to mirror a size of a particular cell type of interest, for example, red blood cells (RBC) (3-8 microns), white blood cells (WBC) (6-15 microns), circulating tumor cells (CTC) (8-15 microns), or platelets (approximately 2 microns).

The type of cell of interest may vary depending on the type of sample being investigated. For example, if the sample is a cerebrospinal fluid sample and the imaging is being performed to investigate the presence or absence of blood cells in the cerebrospinal fluid, the beads sizes may be chosen to parallel the sizes of red and/or white blood cells. The size of the PVA beads may be limited by the diameter of the printing needle of the automated hematology analyzer system, as the beads are printed through the needle during sample preparation.

PVA beads can be produced to varying specifications, e.g., monodisperse in 10% solution w/v in water.

Calibration and Quality Control Fluids

Given the present disclosure, it is possible to create tubes of calibration fluids that contain beads, which can then be sampled, printed, stained, and imaged by image-based hematology analyzers, such as a cobas m 511 integrated hematology analyzer (Roche Diagnostics, Inc.). Given the current palette of options available, the bead types that can be used as surrogates include at least the following:

Silica 10-micron orange (stained orange by image-based hematology analyzers)—surrogate for neutrophils Polystyrene 10-micron blue—surrogate for lymphocytes Polystyrene 10-micron green—surrogate for monocytes Polystyrene 10-micron red—surrogate for eosinophils Polystyrene 10-micron black—surrogate for basophils Cellulose 5-micro (stained by image-based hematology analyzers)—surrogate for RBCs and HGB (hemoglobin)/MCH (mean cell hemoglobin) measurements Silica sub-5-micron (stained purple by image-based hematology analyzers)—surrogate for platelets.

In addition to beads, purified, stabilized RBCs can be used as a surrogate for RBCs and HGB/MCH measurements.

In principle, this means that these calibration fluids can be used to:

(1) verify sample printing (or smear) performance of image-based hematology analyzers by counting the number of beads in solution, and evaluating the print uniformity;
(2) verify the staining performance of image-based hematology analyzers by measuring the amount of stain uptake of the stainable beads, e.g., silica or cellulose beads;
(3) verify the wash efficiency and wash conditions be detecting any wash off;
(4) verify the performance of image-based hematology analyzers by counting the different beads types, and sorting the types accordingly; and
(5) if HGB and other RBC parameters are available on an image-based hematology analyzer, then beads or stabilized RBCs could be used in the solution for verification of these parameters.

Automated Image-Based Hematology Analyzer Systems

Subsequent processing steps that are used to prepare a sample applied to a substrate can include exposing the sample to one or more fluids for fixing, staining, and rinsing the sample. Fluid transport steps, such as fluid delivery, agitation, and fluid evacuation, and other preparative steps such as drying, can also be involved in sample preparation.

In general, automated, image-based hematology analyzer systems, e.g., such as the cobas® m 511 integrated hematology analyzer (Roche Diagnostics), for example, as disclosed in, e.g., U.S. Pat. Nos. 9,217,695; 10,094,764; and 10,764,538, provide for rapid, efficient, and uniform sample processing using minimal fluid quantities. The methods of using such systems typically include one or more fixing, staining, and rinsing phases, including one or multiple agitation phases during or after one or more of the fixing, staining, and rinsing phases. The systems can be implemented as a standalone device or as a component in a larger system for preparing and examining biological samples.

Figure 2:
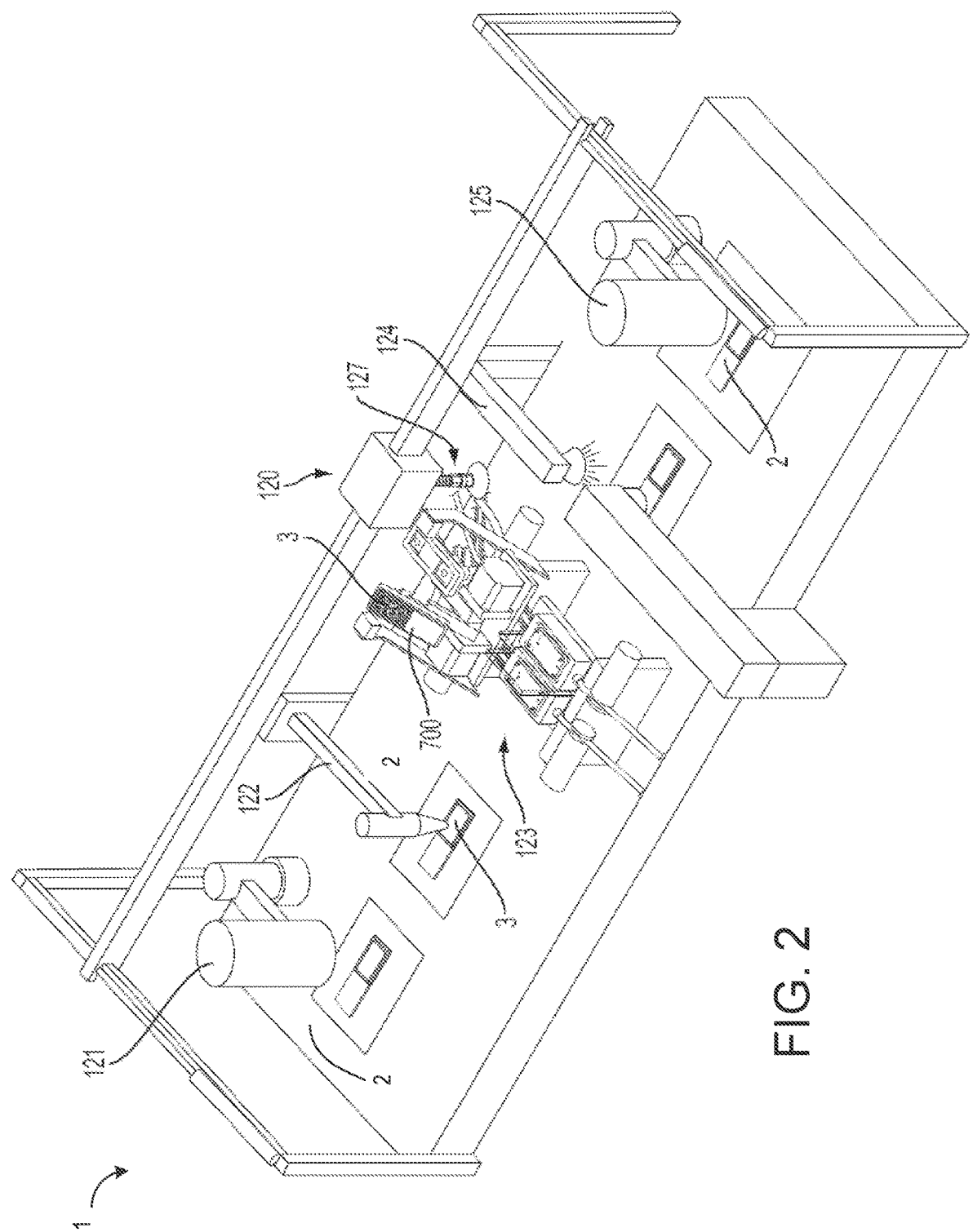
FIG. 2 is a schematic of an automated specimen processing system in accordance with one embodiment of the present disclosure.

Roche's cobas m 511 integrated hematology analyzer, an example of which is shown in the figures, includes printing, staining, and imaging stations to execute the phases described above. FIG. 2 shows an automated hematology analyzer system 1 that receives a substrate 2 and moves the substrate 2 through multiple stations (e.g., stations 121, 122, 123, 124, and 125). The automated hematology analyzer system 1 includes a substrate mover 120 for transporting the substrate 2 between stations (e.g., from station 121 to station 122, to station 123, to station 124, and to station 125). Substrate mover 120 can include a gripper 127 for holding the substrate 2, and registration circuitry or software to enable the mover 120 to determine whether the substrate 2 is mounted in the mover 120.

FIG. 2 shows a system having a first label reader station 121, an applicator station 122, a staining station 123, an imaging station 124, and a second label reader station 125. The first label reader station 121 is configured to read information from substrate 2 such as a bar code and/or "fingerprint" information that is used to identify the particular substrate 2. The second label reader station 125 functions in a similar manner, and the information it reads is used to verify that the sample 3 that is imaged at imaging station 124 is the same as the substrate that was processed.

Printing Station

Figure 3:
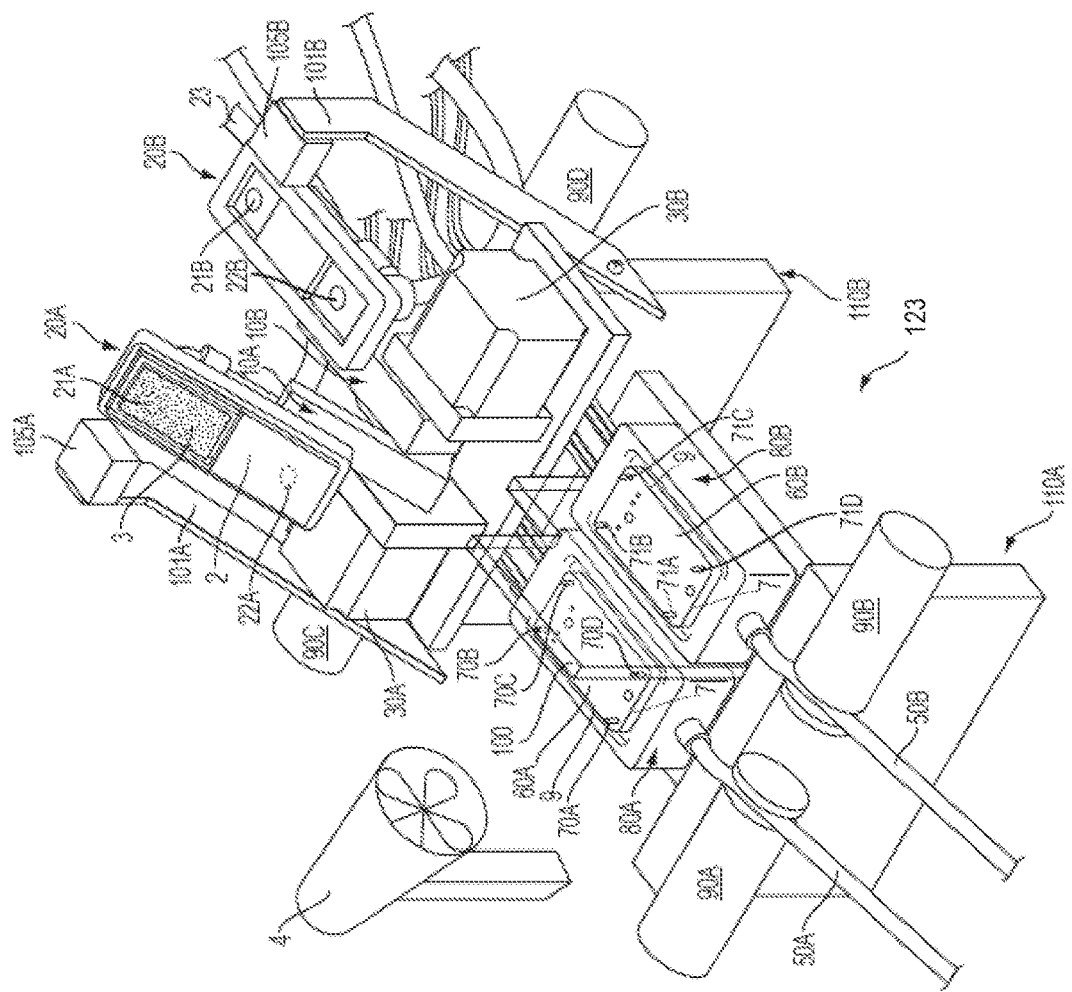
FIG. 3 is a schematic of a staining assembly of the automated specimen processing system of FIG. 2.

At an applicator station (also called a printing station) 122, a fluid is deposited, e.g., by a hollow needle (not shown), onto the substrate 2. The substrate may be or can include a microscope slide, a cover slip, or other transparent material suitable for holding a sample during sample processing and microscopic examination after sample processing. The substrate can be formed from one or more materials that may or may not be transparent to radiation within at least the visible portion of the electromagnetic spectrum. Examples of such materials include, but are not limited to, various glasses, quartz, fused silica, and a variety of polymers, some of which may be transparent. The embodiment of FIG. 3 shows a glass microscope slide, substrate 2, which includes a biological sample 3. The deposited fluid becomes the sample 3, which is then stained and imaged at later stations in the automated hematology analyzer system. The hollow needle has a diameter larger than the diameter of the beads and is positioned at a height at least as tall as the diameter of the beads.

Staining Station

Referring to FIG. 3, staining station 123 can include supports 110A and 110B to secure the staining station 123 to a location within a system or a laboratory workstation. Staining station 123 also includes one or more substrate arms 10A and 10B, each connected at their base to an actuator 30A and 30B. The opposite ends of the substrate arms 10A and 10B include substrate grippers 20A and 20B for receiving and holding substrates during sample processing. Each substrate gripper 20A and 20B receives and holds a substrate 2 while staining station 123 completes sample processing steps (described below). Using suction ports, substrate grippers 20A, 20B can hold the substrate 2 to substrate arms 10A, 10B during sample processing. A suction tube 23 provides suction to the substrate grippers 20A and 20B through suction ports 21A and 21B, and 22A and 22B (note that ports 21A and 22A are positioned behind substrate 2 in FIG. 3, and are shown in dashed lines). The embodiment shown in FIG. 3 is a dual substrate system, capable of holding and processing a substrate on each of substrate arms 10A and 10B. Other embodiments may provide for processing a single substrate or three or more substrates, sequentially or simultaneously.

While staining station 123 shown in FIG. 3 is configured to accept and process samples on two substrates, in the following discussion and figures, reference may be made to only one set of components in staining station 123 (e.g., substrate gripper 20A, actuator 30A, and substrate arm 10A). However, it is to be understood that the same steps, features, and attributes that are disclosed in connection with one set of components can also apply to the other set of components in staining station 1 (e.g., substrate gripper 20B, actuator 30B, and substrate arm 10B). Thus, while the discussion herein focuses only on one set of components for clarity and brevity, it is understood that machines or devices for sample examination such as staining station 123 can include two or more than two sets of components, each set having some or all of the features discussed herein.

Fluid delivery to sample 3 on substrate 2 occurs through platforms 60A and 60B, which can be attached to blocks 80A and 80B, respectively. Platform 60A can include offsets 70A-70D to provide a separation between the surface of platform 60A and substrate 2, and prevent substrate 2 from contacting platform 60A. Platform 60B can include a corresponding set of offsets 71A-71D. Offsets can include standoffs, pins, pegs, rods, beads, walls, or other structures that provide separation between the surface of platform 60A and/or 60B and substrate 2. Platforms 60A and 60B have long edges 9 and short edges 7. Divider 100 is positioned between platforms 60A and 60B substantially parallel to long edges 9 of platforms 60A and 60B. Waste tubes 50A and 50B may extend through valves 90A and 90B and waste tubes 51A and 51B (shown in FIG. 4) may extend through values 90C and 90D. The waste tubes 50-51A and 50-51B may carry fixative, stain, or rinse fluid to waste containers 230 and 231 (shown in FIG. 4). The valves 90A-90D may be mechanically, electrically, hydraulically, or pneumatically actuated through actuators contained within or external to the valves.

Figure 4:
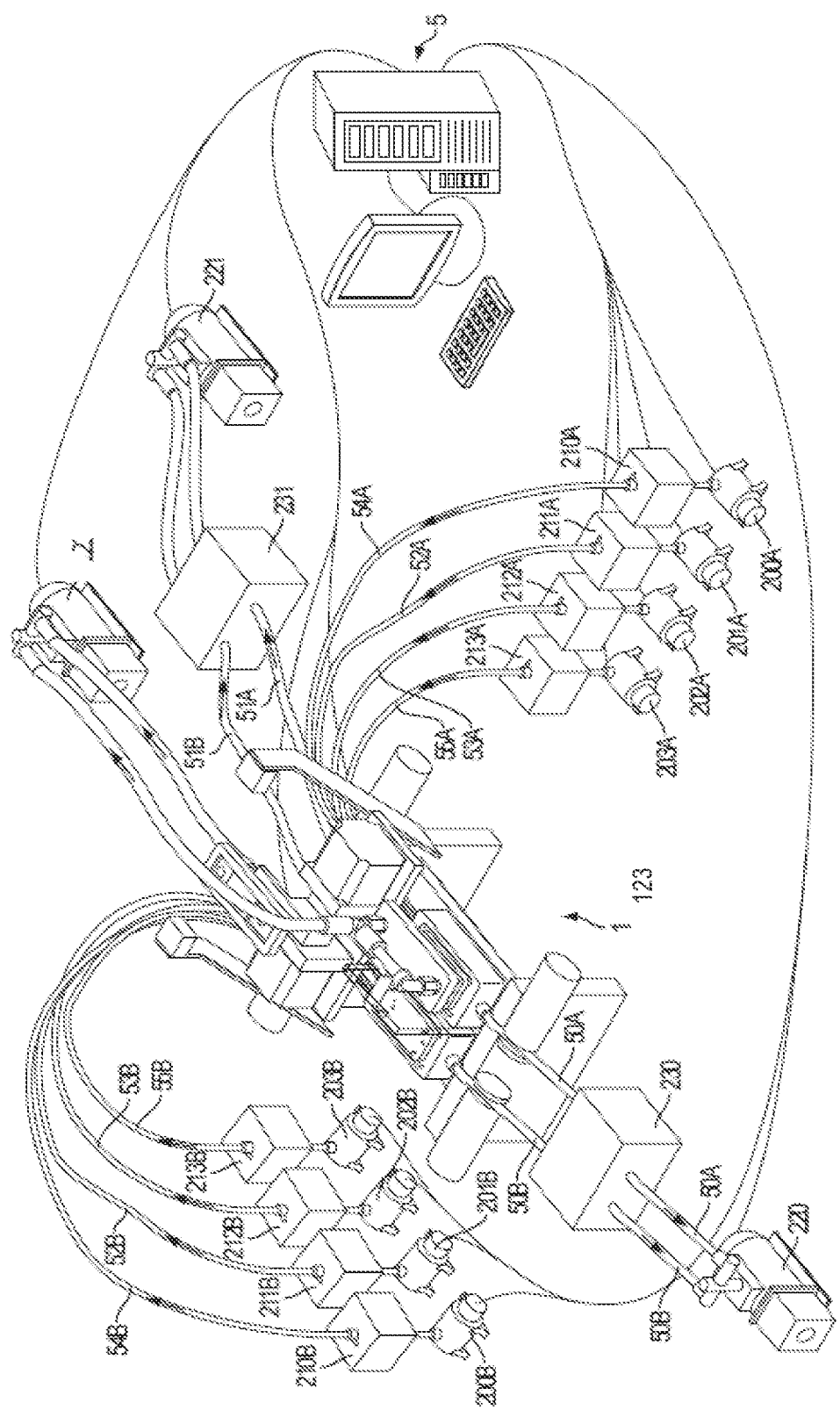
FIG. 4 is a schematic of a pumping and control system connected to the staining assembly of FIG. 3.

Staining station 123 can include or connect to a control system 5 as shown in FIG. 4, which provides another perspective view of the staining station 123. Depending upon the nature of sample 3, a number of different processing phases can be performed as part of an overall processing sequence to prepare the sample for examination. Examples of such phases are discussed below. However, it should be appreciated that a wide variety of different processing phases and combinations of phases can be performed using the systems disclosed herein, including phases not specifically discussed as examples herein. In certain embodiments, control system 5 can detect the position of the substrate arms 10A and/or 10B utilizing one or more sensors 105A and 105B to detect indicator arms 101A and 101B. Sensors 105A and 105B can be proximity sensors, e.g., photoelectric sensors, utilizing, e.g., infrared light or various other technologies (lasers, motion detectors, inductive sensors, capacitive sensors, resistive (i.e., contact) sensors or switches) to detect the presence or absence of the substrate arms 10A and/or 10B. For example, sensors 105A or 105B can have a detection field, and the sensors can determine whether or not a substrate arm (e.g., arm 10A and/or 10B) or a substrate gripper (e.g., gripper 20A and/or 20B) is within the detection field. Control system 5 can receive information from the sensors to determine the positions of substrate arms 10A and/or 10B. In certain embodiments, the control system 5 can dry the sample 3 using a dryer 4 attached to system 1. For example, dryer 4 can direct a flow of air across the sample 3.

Referring to FIG. 4, one or more fluid tubes 52-55A can be connected to a port inside platform 60A and a respective fixative or stain reservoir 210-213A. The fluid tubes may also include a connection to a pump 200-203A and/or a valve capable of directing fixatives or stains from the reservoir through the tube and a port located on the platform, and onto a substrate and sample. As an example, pump 200A can direct fixative or stain from reservoir 210A through tube 54A, through block 80A, out from port 44A, onto platform 60A, into the gap 92 between the platform 60A and substrate 2, and onto substrate 2 containing sample 3. After applying a specific quantity of fixative or stain to substrate 2, a vacuum or other suction source 220 and/or 221 can evacuate residual fixative from substrate 2 into waste container 230 and/or 231 through waste tubes 50-51A and 50-51B. A second set of fluid tubes 52-55B can be connected to a port inside platform 60A and a respective fixative or stain reservoir 210-213B. The fluid tubes may also include a connection to a pump 200-203B and/or a valve capable of directing fixatives or stains from the reservoir through the tube and a port located on the platform, and onto a substrate and sample.

Control system 5 can include one or more computers each containing a central processing unit capable of executing software instructions stored on computer readable media such as a hard drive, optical drive, or memory. Additionally, control system 5 can include electrical circuitry for executing the software instructions. Control system 5 can include a user interface for receiving user commands to control the operation of system 1. Software stored on or provided to the control system 5, i.e., computer(s), can include programs that control the operation of components of system 1 during sample processing, such as fluid pumps and vacuums. For example, the software can include instructions for directing system 1 to apply various fixatives, stains, and rinses to the sample on the substrate, and to perform several agitation steps during sample processing.

Imaging Station

Imaging station 124 may include, for example, a microscope. In some embodiments, sample imaging can be performed at staining station 123, which may include components such as one or more radiation sources and one or more detectors, and various other optical components, for obtaining sample images. In such embodiments, system 1 may not include a separate imaging station 124, with all of the functions of the imaging station being performed instead at other stations of the system (e.g., at staining station 123).

Calibration of Automated Hematology Analyzer Systems

In general, automated hematology analyzer systems must be calibrated upon the initial setup of the system and during maintenance checks that should occur at regular intervals over the life of the system to ensure proper operation. In both initial setup and maintenance checks, the system's functionality over the full range of operating parameters must be assessed. For example, the automated hematology analyzer system must be able to operate on samples with ranges of 0-5 million platelets and 0-8 million red blood cells, as well as 0-400 thousand WBCs. However, preserved biological samples having biological platelet and red blood cell counts at the upper and lower limits of the automated hematology analyzer system's operating range may be difficult to obtain. Nevertheless, the presently described calibration fluids including cellulose, silica, and/or polystyrene beads provide the ideal solution, because they can be prepared to have the exact, specific concentrations of each bead size, as desired.

Figure 5:
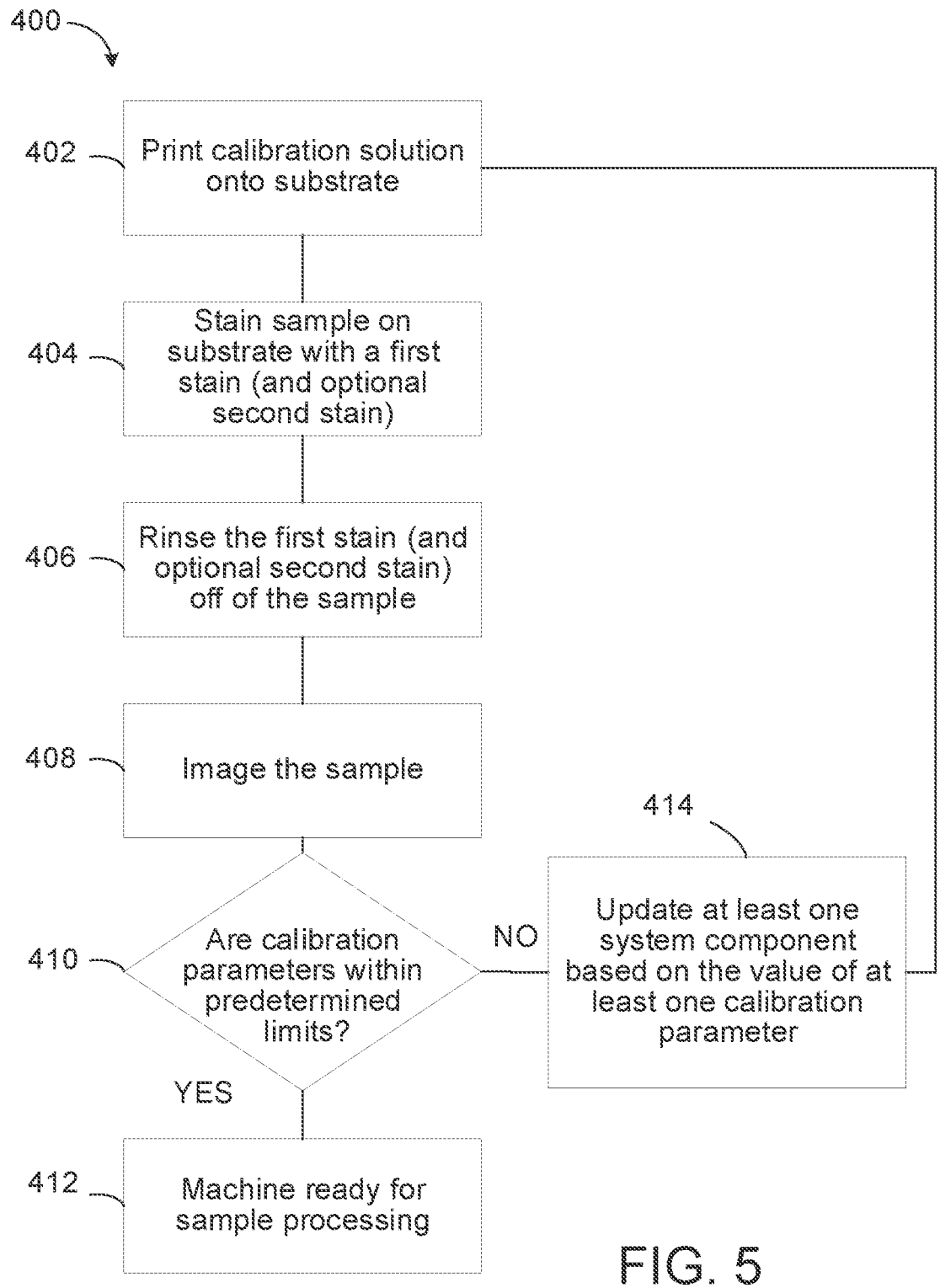
FIG. 5 is a flow chart showing an example of a series of steps for processing a specimen in an automated specimen processing system.

As recited in FIG. 5, during a calibration procedure 400, a calibration fluid containing beads is run through the automated hematology analyzer system in the same manner as an actual biological sample and parameters of the automated hematology analyzer system can be changed based on observations of the calibration fluid. In a first step 402, the calibration fluid is printed onto a substrate. Following an optional step of applying fixative solution to the sample printed on the substrate, the printed sample of the calibration fluid is then stained with a first stain (step 404). The first stain is rinsed from the sample (step 406). Optionally, a second stain may be applied to the sample, either at the same time as the first stain or sequentially. Optionally, the second stain is then rinsed from the sample. The sample is then imaged (step 408).

Based on observations or measurements of the image, one or more calibration parameters are evaluated (step 410) to see whether these parameters are within a set of defined limits. If the calibration parameter is not within the predicted limits for the calibration parameter, at least one component of the automated hematology analyzer system is adjusted 414. After making an adjustment, another sample of the calibration fluid is run through the system and the calibration parameters analyzed in the same way.

Examples of calibration parameters that can be evaluated include sample mixing, imager focal distances and depth of field, LED light intensity and wavelengths, printing sample volume, printing needle distance, relative speed, and relative angle to/from the substrate, and staining applicator functionality. Calibration is assessed by comparing system measurement results (e.g., counts of cell types, differentiation of cell types) to those produced on an independently calibrated system at the time of manufacture of the calibrator fluid. For the printing station, the printing needle distance from the substrate and the printing needle's cleanliness can be investigated. If the outlines of the cellulose, silica, and/or polystyrene beads in an image of the sample taken during calibration appear broken, the print needle may be adjusted to avoid damaging the beads (or cells) as they flow through the needle, or as they flow out of the needle onto the substrate. An image with broken beads may indicate that the printing needle is partially blocked or misshaped, and may need to be cleaned and/or replaced. Additionally, if no beads appear in the image taken during calibration, the print needle may be fully blocked and may need to be cleaned and/or replaced.

In another example, an imaging processing system may count the number of beads in an image taken during calibration. The number of counted beads can be compared to an expected number of beads that would appear in the image with an appropriate amount of calibration fluid applied. For example, if the calibration fluid has a bead concentration of 1000 beads per microliter and the image processing system counts 900 beads, it would be expected that 0.9 microliters of calibration fluid would be applied to the substrate. If the desired volume of the sample to be applied to the substrate is 1 microliter, the printing volume may need to be adjusted.

For the staining station, the new methods enable testing the evenness of the application of the stain to the sample. For example, if the beads (e.g., cellulose, derivatized silica, or other beads that can be stained by the system), which take up a particular dye or dyes on one portion of the substrate, appear to be more heavily stained than the beads on another portion of the substrate, the staining applicator may need to be adjusted.

In another example, if the beads appear unstained in an image taken during calibration, the staining apparatus may have a clog or a leak. If the particular protocol being calibrated on the automated hematology analyzer system requires multiple stains to be applied to the substrate, the application and evenness of both stains can be assessed. The imaging stations can measure the absorbance or transmittance of light through the substrate containing the dye.

Because the absorbance and transmittance values are related to the volume of dye deposition on the substrate during the sample preparation process, and to the area over which the dye is placed, such values can be assessed to determine whether the instrument precisely deposited a desired sample quantity on the slide. For example, the spectral qualities of a dye can govern the color captured in an image of a printed blood sample and/or sample containing beads of a given thickness. Therefore, a thickness of an evenly printed and stained sample over a given area can be estimated based on one or more acquired images. From the estimated thickness and the area of the printed sample, it is possible to calculate the amount of dye dispensed on a substrate. Therefore, a dye with known spectral characteristics can be used to estimate and/or calibrate the amount of sample that a dispenser deposits on a given surface. Likewise, in accordance with another embodiment of the present disclosure, beads, i.e., cellulose beads, silica beads, or polystyrene beads, can be employed to detect if one side of a printed sample containing the beads is thicker than the other, which can indicate, for example, that the printing needle has become bent or is otherwise out of tolerance for the analyzer.

Based on the clarity or fuzziness of an image taken during calibration, the focus of the imaging system can be adjusted to bring the sample into sharpest view. In another example, an imaging system can be used to capture an image of the calibration sample including beads and the image processing system can be used to calculate a size (e.g., by a diameter measurement) of the beads. Because the beads in the sample are of a known size, the imaging system or image processing system can be adjusted so that the measurements of the beads taken from the image are within an allowed range of known sizes. In another example, if the beads are stained with a specific stain, e.g., a fluorescent stain, which is absorbed or excited by applying a particular wavelength of light at the imaging station, and the beads do not appear to absorb or fluoresce, the light source for the particular wavelength at the imaging station may not be working correctly.

After making adjustments to the automated hematology analyzer system after running a calibration protocol as discussed above, another calibration protocol can be started. In the subsequent calibration protocol, the user can check that the adjustments made after the first calibration protocol were properly done and if any additional adjustments need to be completed before samples may be analyzed on the automated hematology analyzer system.

EXAMPLES

It is understood that one or more of the aforementioned embodiments of the disclosure may be combined as long as embodiments are not mutually exclusive. In order that the embodiments of the present disclosure may be more readily understood, reference is made to the following examples, which are intended to illustrate the disclosure, but not limit the scope thereof.

Example 1—Cellulose Beads

Initial testing with cellulose beads mixed in serum, proved that these beads could be stained and imaged by the cobas m 511 integrated hematology analyzer (FIG. 1). Application of the entire automated staining protocol showed that only a portion of the beads applied to the substrate remained after the staining process. Subsequent experiments with the acrylic water-soluble were then performed (Example 2).

Example 2—Cellulose Beads in Acrylic Water-Soluble Polymerizing Resin

To get the beads to stick better to the slide (substrate), an acrylic water-soluble resin was added as a component of the calibration fluid. Beads were suspended in the resin, placed on the cobas m 511 integrated hematology analyzer, and processed normally. The results showed that because of the thin layer of resin deposited on the slide, the resin would cure before the staining step, and cause the beads to adhere to the glass surface.

Cellulose beads of 10-micron size and concentration of roughly 0.2% were mixed with a resin matrix. The acrylic water-soluble polymerizing resin was used at a concentration of about 0.25% by weight.

Two types of water-soluble polymerizing resins were tried - acrylic and polyurethane. These were tested in a 5-50% concentration (final) range to develop a most useful range of about 1 to 10%.

The polyurethane resin stains a light blue from the cobas m 511 integrated hematology analyzer staining process, while the acrylic resin is clear.

As shown in FIG. 1, these results indicate that water-soluble acrylic (or other) polymerizing resin matrix is required to allow the system to clean itself properly using the DigiMAC3 wash between samples.

Example 3—Silica Beads

Silica beads were also tested. These beads could be pre-stained with a number of dyes. For example, silica beads can be obtained that are pre-stained, similar to polystyrene beads. These can be used as an alternative to polystyrene beads. Such silica beads are pre-stained by exposure to a dye that is solubilized in an organic solvent, and then suspending the silica beads in an aqueous buffer, thereby trapping the dye inside the silica bead.

In particular, 7-micron silica beads were used at a concentration of approximately 0.1%, 10-micron silica beads were used at a concentration of approximately 0.05%, and sub-5-micron silica beads were used at a concentration of approximately 0.1%. The acrylic water-soluble polymerizing resin was used at a concentration of about 5%. The glucose was used at a concentration of about 4%. Concentration ranges initially tested were 0-0.5% for all beads, 0-50% for the water-soluble polymerizing resins, 0-10% for glucose, and 0-5 million RBC/microliter.

Two types of water-soluble polymerizing resins were tried—acrylic and polyurethane. These were tested in a 5-50% concentration (final) range to develop a most useful range of about 1 to 10%. The polyurethane resin stains a light blue from the cobas m 511 integrated hematology analyzer staining process, while the acrylic resin remains clear.

Figure 6:
FIG. 6 is a representation of a microscope image of Green, Yellow, Red, Black pre-stained 10-micron silica beads on a microscope slide.

FIG. 6 is a representation of a microscope image of Green, Yellow, Red, Black pre-stained 10-micron silica beads on a microscope slide.

Example 4—Derivatized Silica Beads

Silica beads that were chemically derivatized with —NH$_2$ (amino), —COOH (acid), and C18 (wax) were obtained from SiliCycle Inc. (Quebec, Canada). These beads were tested by making suspensions in water-soluble acrylic polymerizing resin (5% concentration), and processed on a cobas m 511 integrated hematology analyzer using a DigiMAC3™ stain pack. The concentration of the beads was 0 to 5%.

Figure 7:
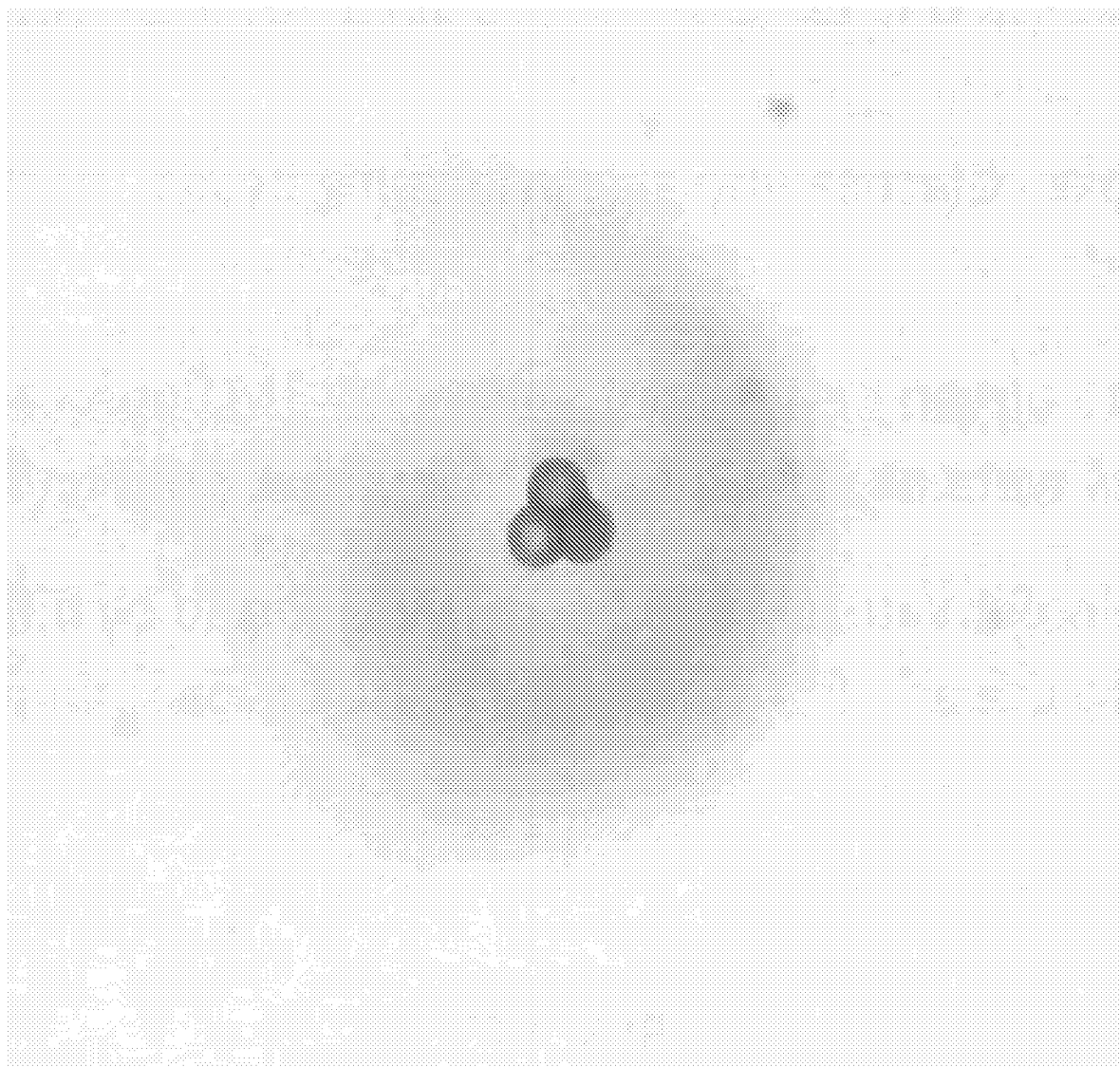
FIG. 7 is a representation of a microscope image of silica beads derivatized with: $NH_2$ (amino, orange), C18 (wax, light blue), and with COOH (acid, dark blue).

FIG. 7 is a representation of a microscope image of the silica beads derivatized with: —NH$_2$ (amino, orange), C18 (wax, light blue), and with —COOH (acid, dark blue).

Example 5—Polystyrene Beads

Pre-stained polystyrene beads were suspended in water-soluble acrylic polymerizing resin and processed on the cobas m 511 integrated hematology analyzer. These beads were of uniform size, and retained their colors after staining on the analyzer. Red, blue, black, and green beads were used due to their availability, and their colors were easily distinguished by manual microscopy.

In particular, 7-micron silica beads were used at a concentration of approximately 0.1%. 10-micron polystyrene pre-stained beads were used at a concentration of approximately 0.05%. The acrylic water-soluble polymerizing resin was used at a concentration of about 5%. Concentration ranges initially tested were 0-0.5% for all beads, 0-50% for the water-soluble polymerizing resins. Two types of water-soluble polymerizing resins were tried—acrylic and polyurethane. These were tested in a 5-50% concentration (final) range to develop a most useful range of about 1 to 10%.

The polyurethane resin stains a light blue from the cobas m 511 integrated hematology analyzer staining process, while the acrylic resin is clear.

Figure 8:
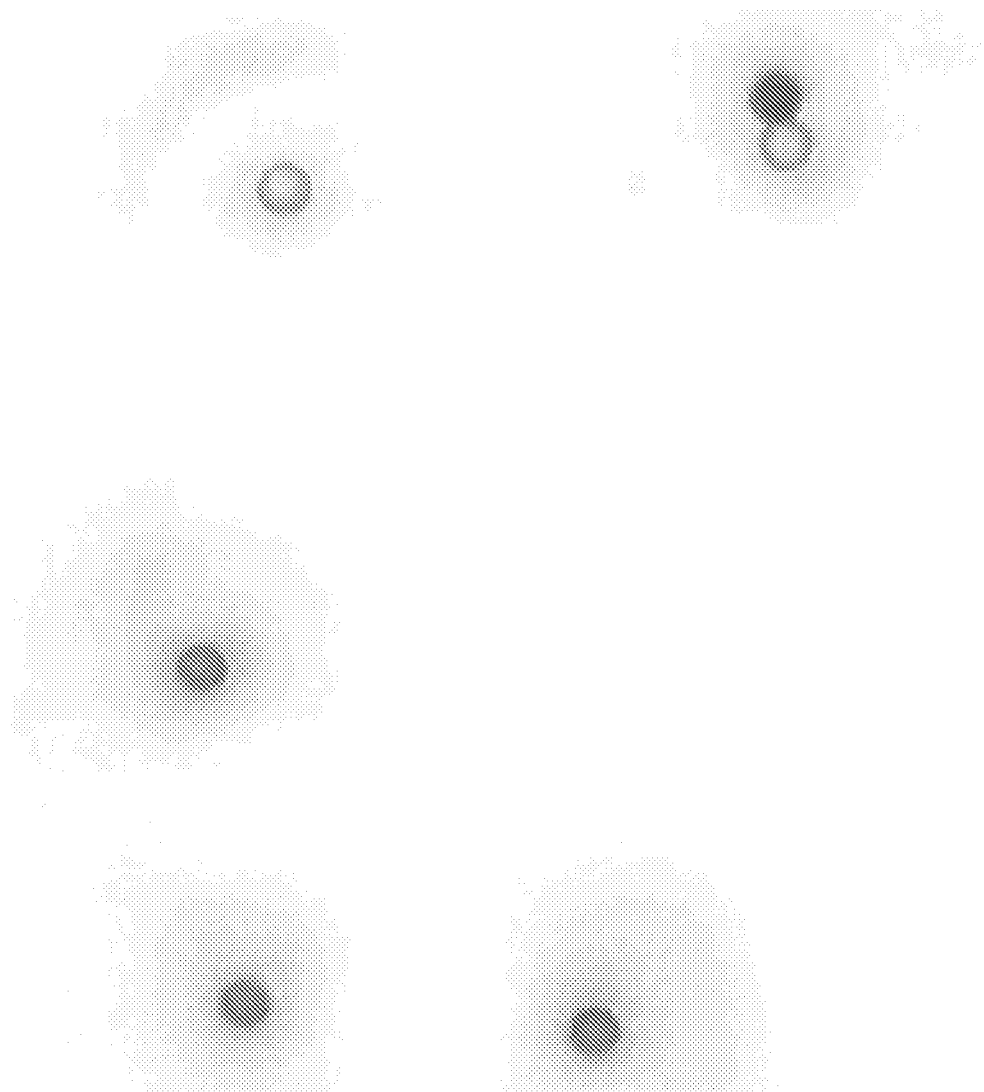
FIG. 8 is a representation of a microscope image of polystyrene beads and silica beads derivatized with $NH_2$ (orange)

FIG. 8 is a representation of a microscope image of polystyrene beads (red, blue, black, and green) and silica beads derivatized with NH$_2$ (orange)

Example 6—RBCs as Components in the Calibrations Fluids

RBCs (0.1-5 million/microliter) were added to the bead suspensions, but initially the RBCs disrupted uniform sample printing. Glucose was added to the calibration fluid, and this was found to make more uniform preparations. The range used was 1%-5% glucose. Glucose also aids in keeping beads attached to the slide, however an acrylic and/or polyurethane water-soluble polymerizing resin matrix was still required.

In particular, 7-micron silica beads were used at a concentration of approximately 0.1%, 10-micron silica beads were used at a concentration of approximately 0.05%, and sub-5-micron silica beads were used at a concentration of approximately 0.1%. The acrylic water-soluble polymerizing resin was used at a concentration of about 5%. The glucose was used at a concentration of about 4%. The RBC's were added at a concentration of about 3 million cells/microliter.

Concentration ranges initially tested were 0-0.5% for all beads, 0-5% for the water-soluble polymerizing resins, 0-10% for glucose, and 0-5 million RBC/microliter.

Example 7—Sub-5 Micron Beads

Un-derivatized silica beads were sorted by filtration to obtain beads below 5-micron diameter to use as a PLT surrogate. These beads stain purple by the cobas m 511 integrated hematology analyzer.

Example 8—Calibration Fluid Testing

A final calibration fluid included:
7-micron silica-NH2 beads (0.1%)
10-micron polystyrene beads (0.05%)
acrylic water-soluble polymerizing resin (5%)
RBCs (3 million cells/ml)
glucose (4%)
sub-5-micron un-derivatized silica beads (0.1%)
Concentration ranges tested in a cobas m 511 integrated hematology analyzer as described in the examples above were 0-0.5% for the beads, 0-50% for the water soluble acrylic polymerizing resin, 0-10% for glucose, and 0-5 million RBCs/microliter.

Figure 9:
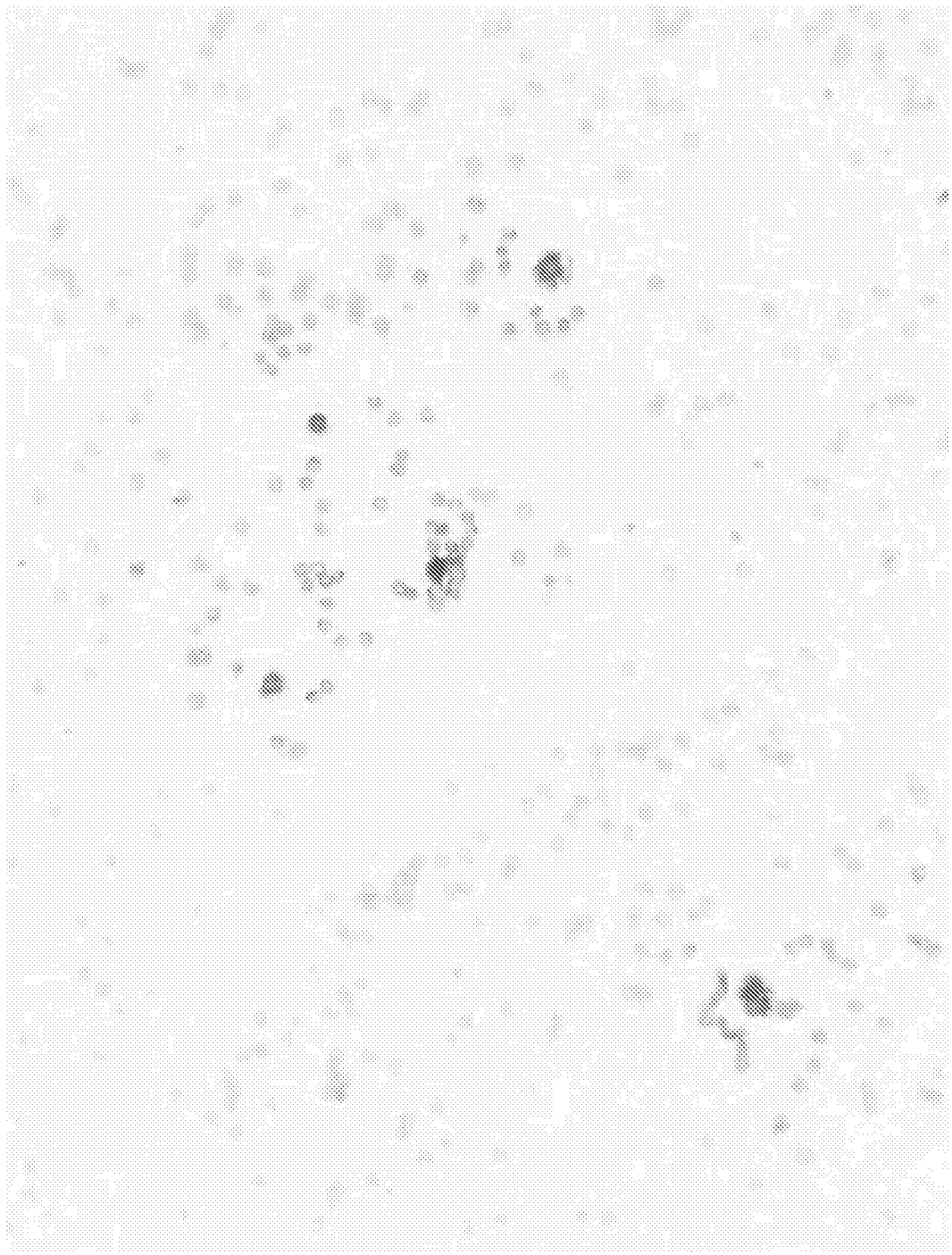
FIG. 9 is a representation of a microscope image of a uniform print of a calibration fluid including 7-micron silica-$NH_2$ beads, 10-micron polystyrene beads, acrylic water-soluble polymerizing resin, RBCs, glucose, and sub-5-micron underivatized silica beads.

The results show that fairly uniform prints can be obtained, that can be processed on the analyzer, which will then give RBC parameter data, and classify some of the small beads as platelets. These results were obtained using released software without modifications. FIG. 9 is a representation of a microscope image of a uniform print of a calibration fluid including 7-micron silica-NH2 beads, 10-micron polystyrene beads, water-soluble acrylic polymerizing resin, RBCs, glucose, and sub-5-micron underivatized silica beads, as described above.

The cobas m 511 integrated hematology analyzer results for this slide were:
WBC 0.21
RBC 0.68
HGB 2
HCT 6.6
MCV 97.8
MCH 30.3
MCHC 31
RDW 15.1
RDWSD 53.2
PLT 5

The gallery from the viewing station showed that the sub 5-micron beads stained by the cobas m 511 integrated hematology analyzer were identified as platelets.

Other Embodiments

A number of embodiments of the present disclosure have been described. Nevertheless, it will be understood that various modifications and variations may be made to the embodiments described herein without departing from the spirit and scope of the disclosure. Accordingly, other embodiments are within the scope of the following claims.

What is claimed is:

1. A calibration fluid for use in an automated sample preparation system, wherein the calibration fluid is automatically applied to a substrate and then stained, the calibration fluid comprising:
a plurality of beads, where the beads are sized and colored to represent at least one type of blood cell; and
a carrier fluid, wherein the carrier fluid comprises a water-soluble polymer or polymerizing matrix at a concentration sufficient to cure the water-soluble polymer or polymerizing matrix between a time of application of the calibration fluid to the substrate and before the calibration fluid is stained.

2. The calibration fluid of claim 1, wherein the plurality of beads are selected from the group consisting of cellulose beads, silicon dioxide beads, poly(methyl-methacrylate)/hydrogel coated beads, melamine beads, cross-linked agarose beads, polyvinylacetate beads, and polystyrene beads.

3. The calibration fluid of claim 1, wherein the beads are functionalized.

4. The calibration fluid of claim 3, wherein the beads are functionalized with one or more of the following groups: mercapto groups, hydroxyl groups, carboxyl groups, disulfide groups, polyvinylalcohol groups, amine groups, maleimido groups, tertiary ammonium groups, quaternary ammonium groups, epoxy groups, carboxylsulfonate groups, and octadecyl groups.

5. The calibration fluid of claim 1, wherein the beads have a diameter of about 1 to about 10 microns, and a density of about 1.0 to about 3.0 grams/cm$^3$.

6. The calibration fluid of claim 1, wherein the water-soluble polymerizing matrix comprises an acrylic or polyurethane resin or wherein the water-soluble polymer comprises hydroxyethyl starch or a cellulose.

7. The calibration fluid of claim 1, wherein the carrier fluid further comprises serum or one or more sugars, or both serum and one or more sugars.

8. The calibration fluid of claim 7, wherein the one or more sugars comprise glucose, fructose, mannose, maltose, galactose, lactose, ribose, and/or rhamnose, as single molecules or dimers, in any combination.

9. The calibration fluid of claim 1, wherein the plurality of beads comprises a first set of beads sized and colored to represent white blood cells (WBCs).

10. The calibration fluid of claim 9, wherein the first set of beads representing WBCs comprises
a plurality of orange silica beads to represent neutrophils;
a plurality of blue polystyrene beads to represent lymphocytes;
a plurality of green polystyrene beads to represent monocytes;
a plurality of red polystyrene beads to represent eosinophils; and
a plurality of black polystyrene beads to represent basophils.

11. The calibration fluid of claim 9, wherein the plurality of beads further comprises a second set of beads, different from the first set of beads, which is sized and colored to represent red blood cells (RBCs).

12. The calibration fluid of claim 11, wherein the plurality of beads further comprises a third set of beads, different from the first set and second set of beads, which is sized and colored to represent platelets (PLTs).

13. The calibration fluid of claim 1, further comprising stabilized red blood cells (RBCs) or stabilized platelets (PLTs), or both stabilized RBCs and PLTs.

14. The calibration fluid of claim 1, wherein the calibration fluid comprises one or more blood components.

15. The calibration fluid of claim 1, wherein the calibration fluid comprises cerebrospinal fluid.

16. The calibration fluid of claim 1, wherein the water-soluble polymer or polymerizing matrix is present in the calibration fluid at a concentration of from about 0.2% to about 10% by weight.

17. The calibration fluid of claim 1, wherein the water-soluble polymer or polymerizing matrix is present in the calibration fluid at a concentration of from about 0.2% to about 5% by weight.

* * * * *